UNITED STATES PATENT OFFICE.

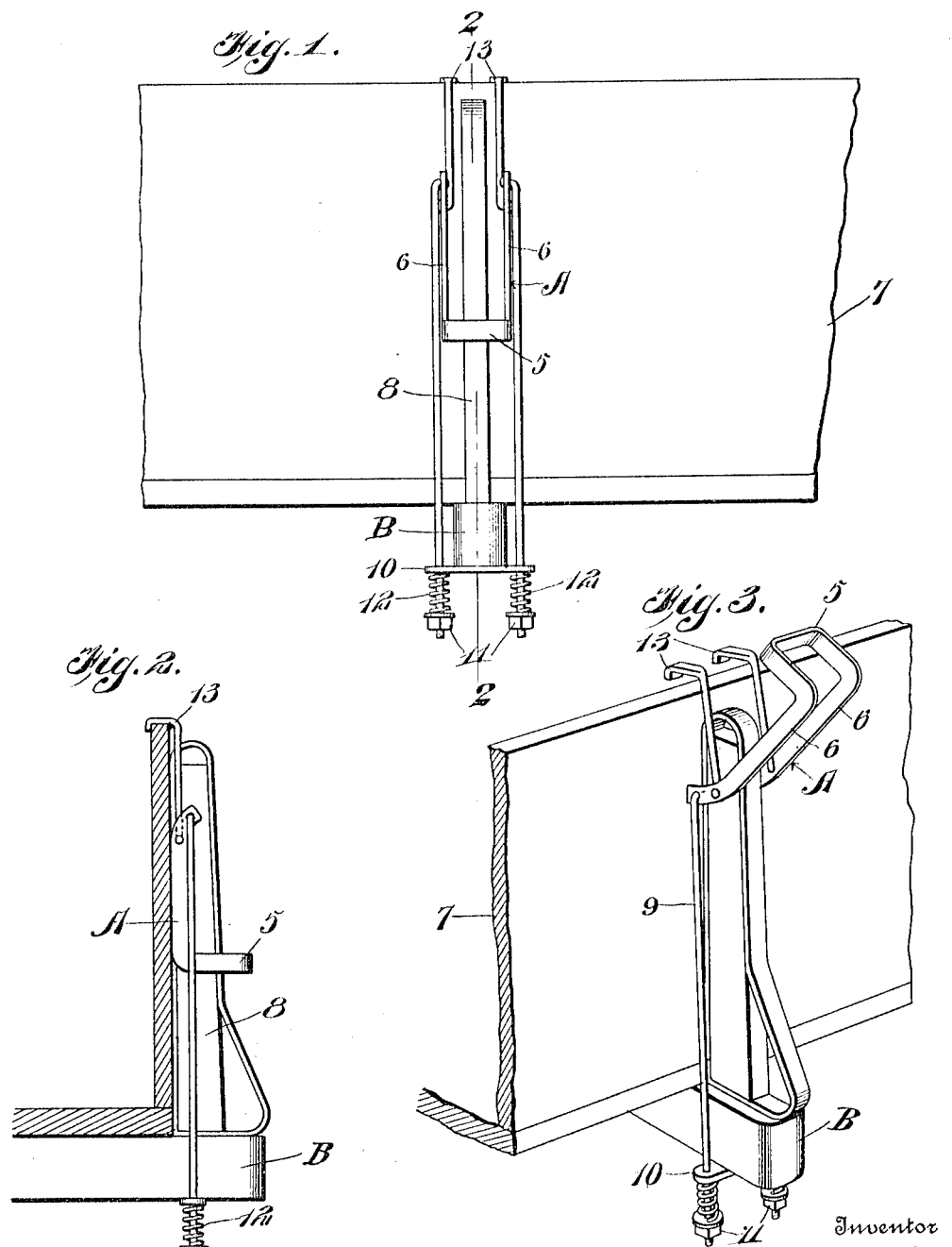

WILLIAM L. KOHLER, OF CARSON, VIRGINIA.

ATTACHMENT FOR FARM-WAGONS.

1,079,248.  Specification of Letters Patent.  Patented Nov. 18, 1913.

Application filed April 8, 1913. Serial No. 759,730.

*To all whom it may concern:*

Be it known that I, WILLIAM L. KOHLER, a citizen of the United States, residing at Carson, in the county of Dinwiddie and State of Virginia, have invented new and useful Improvements in Attachments for Farm-Wagons, of which the following is a specification.

This invention relates to attachments for farm wagons in which the box or bed is mounted loosely on the bolsters, and it has for its object to produce a simple and efficient device, whereby the wagon box may be secured relatively to the bolsters so as to prevent jumping and rattling when passing over rough roads and the wear and tear on the wagon box and running gear resulting therefrom.

A further object of the invention is to produce a simple and efficient device which may be readily applied or detached, as required, and which when mounted in position will serve to hold the wagon box securely and yet resiliently with respect to the bolsters so as to prevent jumping and rattling.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—Figure 1 is a side elevation showing a portion of a wagon box and a bolster supporting the same and showing the improved attachment mounted in position for operation. Fig. 2 is a sectional view taken on the line 2—2 in Fig. 1, and showing the stake, a portion of the bolster and the improved attachment in elevation. Fig. 3 is a perspective view of the improved device illustrating the manner of mounting it for operation.

Corresponding parts in the several figures are denoted by like characters of reference.

The improved device includes a lever member A comprising a yoke 5, the limbs or side members of which, 6, 6, are angular or L-shaped so that portions of said limbs will lie adjacent to the side of a wagon box 7 when the yoke 5 is placed astride one of the stakes 8 rising from the bolster B on which such wagon box is supported.

The limbs or side members 6 of the yoke are terminally slightly curved, and pivotally connected with said limbs, closely adjacent to the ends thereof, are link rods 9, the lower ends of which extend through a cross piece or saddle 10, said lower ends being screw threaded for the reception of nuts 11 between which and the underside of the saddle 10 coiled springs 12 are interposed. Pivotally connected with the limbs or side members 6 at no great distance from the terminal ends thereof are hook members 13; it being observed that the link rods 9 are connected with the limbs or side members 6 intermediate the terminal ends of the latter and the points of pivotal attachment of the hook members 13.

To apply the improved attachment to a wagon, the saddle or cross bar 10 through which the link rods 9 extend is slipped beneath the bolster, and the hook members 13 are hooked over the upper edge of the wagon box, the yoke of the lever member A being meanwhile held in a raised position, as seen in Fig. 3. By pressing downward on the lever member, the link rods will be pulled upward against the tension of the springs 12, and downward pull will be exerted on the hook members 13 until the points of pivotal attachment of the link rods pass beyond a dead center with respect to the pivotal axes of the hook members 13. The yoke of the lever member will now straddle the wagon stake, and the attachment will remain firmly in position until removed by a reversal of the operation. It is obvious that adjustment to wagon boxes of various sizes may be made by adjusting the nuts 11 on the link rods 9. It is also evident that one of the improved devices should be attached preferably to each of the front as well as to each of the rear ends of the box.

It will be readily seen that by the improved attachment the wagon box will be held firmly and yet resiliently on the bolsters, thus preventing the objectionable jumping and rattling which is liable to oc-